March 17, 1970 W. S. ADAMS 3,501,006

SELF-ADJUSTING AND SELF-CLEANING FILTRATION UNIT

Filed June 21, 1968 3 Sheets-Sheet 1

NORMAL FLOW CONDITION

STORM FLOW CONDITION

WILLIAM S. ADAMS
INVENTOR.

BY *William F. Smith*

AGENT

WILLIAM S. ADAMS
INVENTOR.

BY

AGENT

United States Patent Office 3,501,006
Patented Mar. 17, 1970

3,501,006
SELF-ADJUSTING AND SELF-CLEANING
FILTRATION UNIT
William S. Adams, Cumberland, Md., assignor to Hercules Incorporated, Wilmington, Del., a corporation of Delaware
Filed June 21, 1968, Ser. No. 738,963
Int. Cl. B01d 35/14
U.S. Cl. 210—131        20 Claims

ABSTRACT OF THE DISCLOSURE

A self-adjusting and self-cleaning filtration unit having a filament wound filter body impervious to normal pressure flow conditions of liquid and being pervious when expanded by an increase in hydraulic force as applied to the filter body.

---

This invention relates to a self-adjusting and self-cleaning filtration unit for concentrating liquid-borne solids, both organic and inorganic, especially in combined sewer systems.

A typical objective of the present invention may be readily ascertained in consideration of the following. A typical combined sewer system in a small community, for example, delivers an average, dry weather, flow of 125,000 gallons per day to a waste treatment plant. The plant is designed for a much larger capacity, however. Whereas, anticipated population increase and water usage rate increases could be expected to require some additional capacity, the principal requirement for the extra capacity is the necessity of providing treatment of as much as 1,500,000 gallons per day during storms. Treatment of such large quantities is inherently far less satisfactory than normal quantities. However, even this capacity is occasionally exceeded during unusual storms. At such times, raw untreated sewage overflows into the receiving stream. Thus, the installation of a self-adjusting and self-cleaning filter unit according to this invention between the combined sewer system and the plant, serves to concentrate the solid particle matter into a stream which would permit operation of the plant well within its efficient treatment capacity range far into the future. The excessive storm flow water could then be chemically treated to overcome dissolved and microscopically sized solid contaminants and then released, bypassing the treatment facilities.

Another application involves the installation of the filter unit at the outfall of an existing old combined sewer system to limit the volume of sewage requiring pumping into a force main to transmit it to a distant treatment plant. Economies are thereby gained not only by reducing the pumping load, but also by limiting the size of pipelines, and the quantity of sewage to be treated at the plant. In addition, the occasional release of raw overflow due to unusual storms would be avoided.

With reference to the foregoing objectives, it will be readily appreciated that a primary object of the invention is to provide a unit which will significantly reduce suspended solids in the overflow effluent from combined sewers during storm runoff conditions. Other objects will appear hereinafter the novel features and combinations being set forth in the appended claims.

Generally described, the self-adjusting and self-cleaning filtration unit according to this invention comprises a filter body having a filament wound flexible structure bound together by resinous material, and said filter body being substantially impervious to normal pressure flow conditions of liquid and being pervious when expanded by an increase in hydraulic force as applied to the said filter body.

Representative embodiments of the invention have been chosen for purposes of illustration and description and are shown in the accompanying drawings wherein reference symbols refer to like parts wherever they occur and in which.

Figure 1:
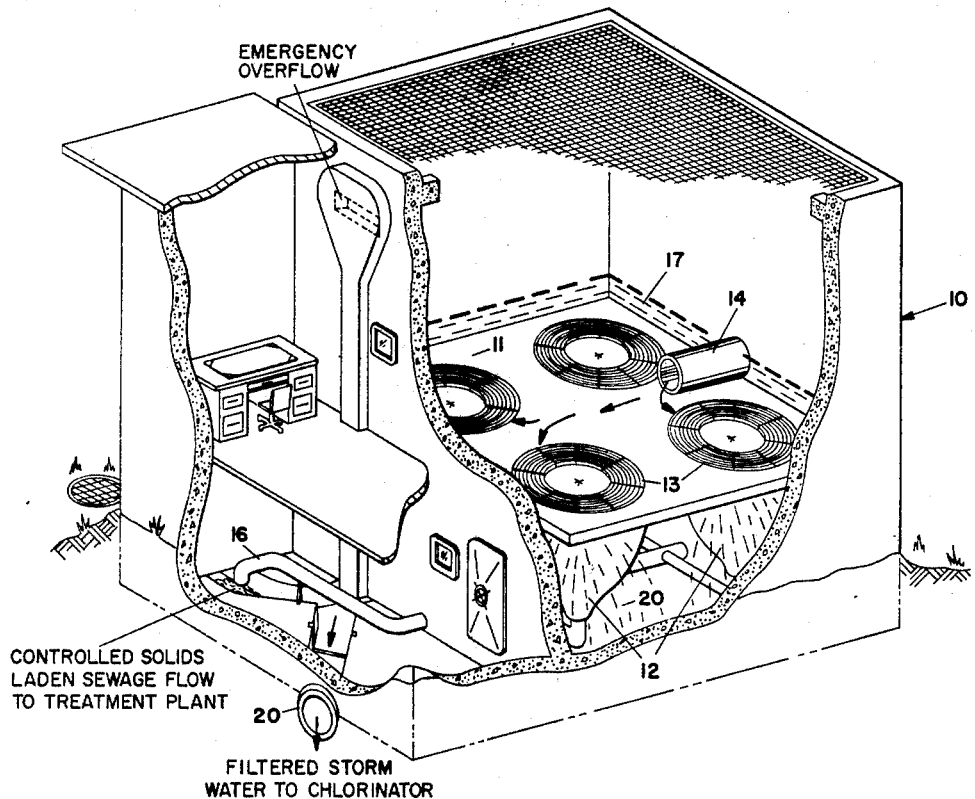
FIGURE 1 is an isometric view of a demonstration plant utilized to establish the efficacy of the present invention.
Figure 4:
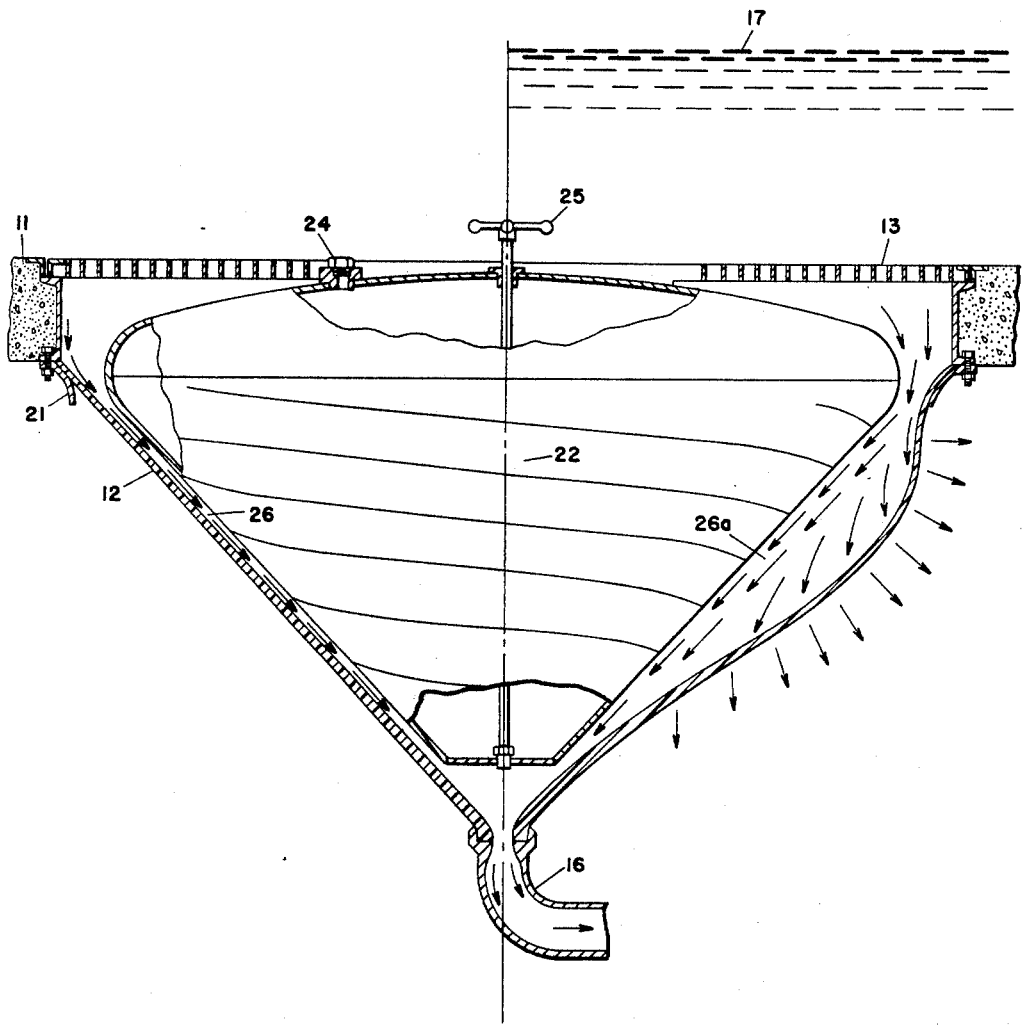
Figure 5:
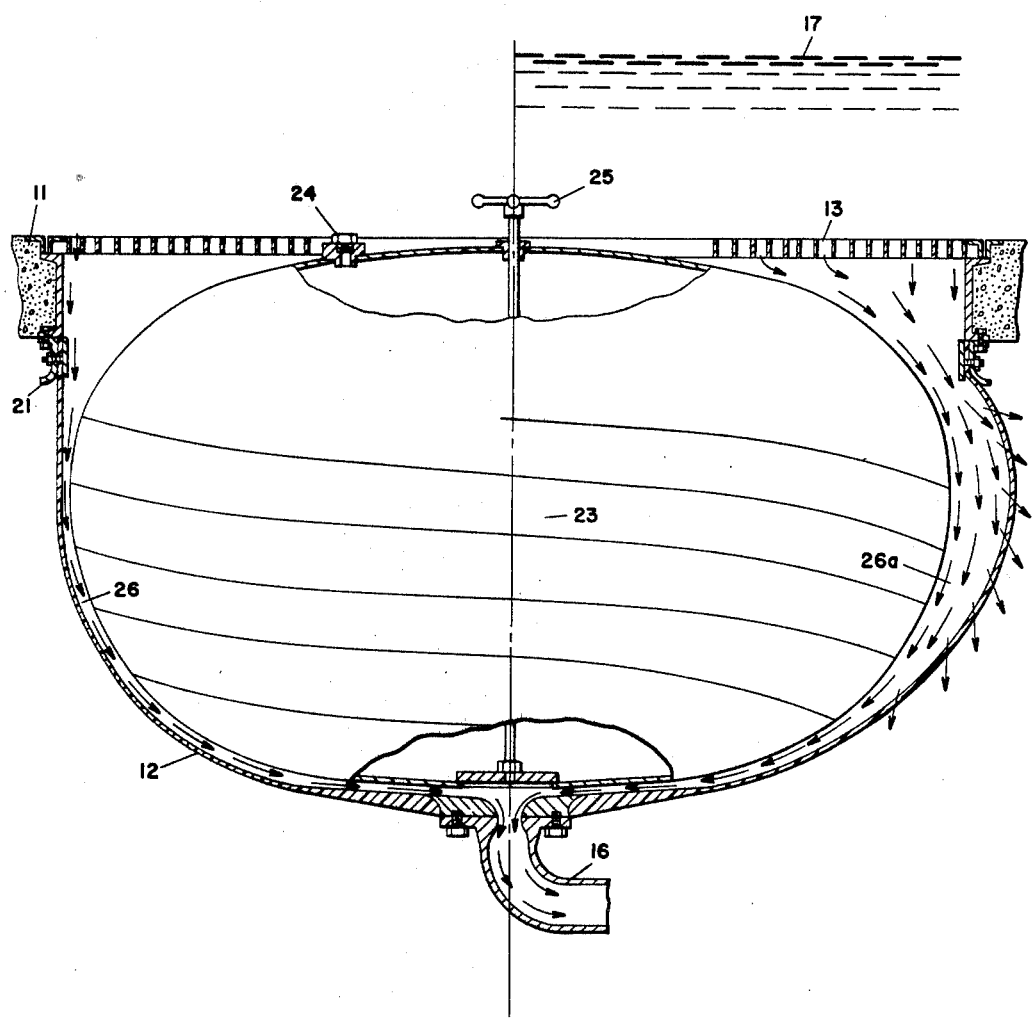

FIGURE 4 is a vertical, sectional view of the conical shaped filter unit depicted in FIGURE 1 with the left side of the sectional view showing the filter configuration under normal flow conditions and the right side showing the filter configuration under storm flow conditions; and FIGURE 5 is a vertical, sectional view of another embodiment of the invention depicting an ellipsoidal shaped filter unit with the left side of the sectional view showing the filter configuration under normal flow conditions and the right side showing the filter configuration under storm flow conditions.

In FIGURE 1, a demonstration plant 10, is of two level construction having an intermediate floor 11 supporting a plurality of filters 12. Trash racks 13 are disposed above the filters 12. An ingress conduit 14 adapted to accommodate dry weather sewage as well as storm weather sewage enters through one wall of the plant 10 at a level above the intermediate floor 11.

Figure 2:
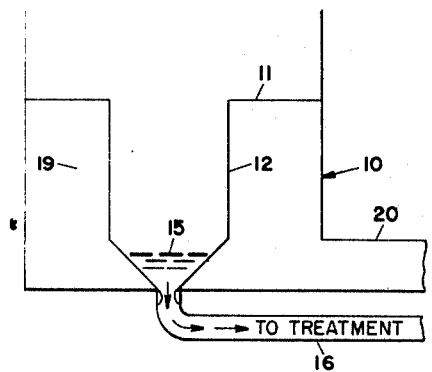
FIGURE 2 is a diagrammatic view demonstrating the principle of the invention under normal flow conditions.
Figure 3:
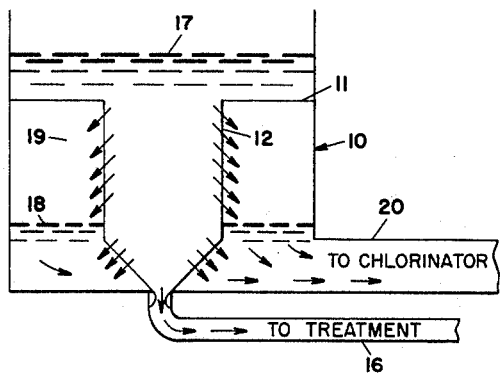
FIGURE 3 is a digrammatic view demonstrating the principle of the invention under storm flow conditions.

Reference is now made more particualrly to FIGURES 2 and 3, which schematically depict the principle of the invention. In FIGURE 2, the filter body 12 is a filament wound structure which under normal flow conditions of sewage represented by normal flow elevation 15 remains impervious, thus permitting all the sewage passing thereinto to pass therefrom through a sewage egress conduit 16 to a sewage treatment plant (not shown). In FIGURE 3, the filter unit of FIGURE 2 under storm flow conditions represented by storm flow elevation 17 is flexed due to the increased hydraulic head and becomes pervious, thus permitting the storm water to filter through the filter unit 12 as evidenced by filtered water elevation 18 in a receiving area 19 from which it is passed through a filtered water egress conduit 20 to a chlorinator unit (not shown). Under this condition, the solids laden sewage from within the filter unit 12 is passed therefrom through the sewage egress conduit 16 to the sewage treatment plant under conditions similar to normal flow.

From the foregoing, it will be appreciated that this invention in one aspect contemplates a self-adjusting and self-cleaning filter unit to concentrate the solids loading of the influent to a combined waste treatment plant during storm flow conditions by removing the surplus water, thus preventing overloading of the plant's treatment capacity. The filtered surplus water is then chlorinated and discharged into the plant outfall.

The self-adjusting and self-cleaning filter unit will now be described with particular reference to FIGURES 4 and 5. The filter 12 is a filament wound structure, in each instance, where in FIGURE 4 the filter is of conical shape and in FIGURE 5 the filter is of ellipsoidal shape. Since the functioning of the two forms is quite similar, reference symbols refer to like parts wherever they occur. The filter 12 is attached at its upper end by a retaining ring 21 to the floor 11. A conical swirl baffle 22 in FIGURE 4 and an ellipsoidal swirl baffle 23 in FIGURE 5 is disposed in juxtaposition to the main body of the filter 12. The swirl baffles in each instance are supported by the trash rack 13 disposed thereabove and supported by the floor 11. A ballast fill 24 and a dump screw 25 is provided for filling and dumping, respectively, the contents of the swirl baffles 22 or 23.

With further reference to FIGURES 4 and 5, it is immediately apparent that under normal flow conditions as depicted at the left half of the drawings that the filter 12 is not expanded and remains impervious permitting the dry weather sewage to flow through a narrow passage 26 and out through the conduit 16. On the other hand, under storm flow conditions as depicted at the right half of the drawings, the filter 12 is expanded, becomes pervious, permits passage of excessive storm water through the filter and the previously narrow passage 26 is enlarged to a wider passage 26a to accommodate the concentrated storm sewage for passage into and out through the conduit 16. The expansion and contraction characteristics of the self-adjusting filter produce a flexing action which also is inducive to self-cleaning.

The filter 12 may be manufactured according to the processing techniques developed by R. E. Young as particularly described in U.S. Patents Nos. 2,843,153; 3,025,205; 3,047,191; and 3,083,864. In applying the Young technique or other filament winding technique to the present invention, the filter is wound so as to produce random, hairline cracks commonly called "crazing." The crazing effect allows liquids to pass through the filter walls at a rate proportional to the pressure and the extent of the crazing. Moreover, the self-cleaning feature of the filter unit may comprise a glazed inner liner (gel coat) with numerous, random, hairline cracks (crazings) and additionally an enclosed swirl baffle body 22 or 23 designed to provide the hydrodynamic shearing forces to keep the filter unit clean. This is more readily appreciated from the following.

Filament wound structures in tension due to internal pressure expand until the tensile stress of the fibers, corrected geometrically for their orientation, generates a balancing compression on the pressurizing medium. In filament wound structures, the orientation of the fiber can be precisely controlled so that the desired degree of expansion, and consequently leakage rate, can be obtained for a corresponding demand. Thus, when demand for flow is great, and pressure due to hydrostatic head increases, the leakage rate, due to expansion of the structure, will increase correspondingly. This self-adjustment of leakage, or filtration, rate to demand is a unique feature of filament wound filter elements according to this invention.

The filaments in such a structure are bound together by a resinous material, which also performs other functions. One function is to serve as a smooth, glazed, easy to cleanse internal surface for the period of normal or dry weather flow. During this time a slight compressive prestress of this lining resin will result from the residual tension in the filaments which occurs during the filament winding process. This compressive prestress causes the internal wall surface to be watertight when there is insufficient internal pressure to overcome the prestress. Another function is to protect the fibers from possible corrosive elements by serving as an impervious coating. Still another function is to serve as a carrier for slime growth inhibiting chemicals.

In order to satisfy these major functions of the resinous binder, two distinct resin compositons may be used. The first, applied at the interior surface, has the characteristics of high modulus and low elongation, so that it satisfactorily resists the prestressing action of the filaments and yet cracks into the desired pattern of pore openings when subjected to elongation due to expansion of the structure resulting from an internal pressure greater than the prestress. The other resin serves primarily as a binder and protector for the filaments and must, therefore, have the characteristics of low modulus and high elongation. It is also possible in some instances to have one resin combination to perform both functions.

From the foregoing, it is readily apparent that the present invention may be practiced using conventional materials of construction, such as corrosion resisting steel, brass, vitrified clay, or plastic for the swirl baffle and water, sand, lead shot and the like for the ballast fill with the trash racks, conduits, etc., being decidedly conventional. Examples of satisfactory filter windings for practicing the invention are given in the following summary:

SUMMARY OF FILTER WINDINGS

| Example | Materials | | | Winding angle | Gel coat thickness |
| | Fiber | Winding resin | Gel coat resin | | |
| --- | --- | --- | --- | --- | --- |
| 1 | Polypropylene (1050 denier). | Epon 826/ZZL-0803 | Epon 826/ZZL-0803 | 15°, 2 layers | 6-7 mils on Filter-Section A. |
| 2 | Fiberglass and fiberglass cloth. | do | do | 15°, 1 layer | 6-7 mils on Filter-Section B. |
| 3 | Polyester | do | do | 15°, 2 layers | 6-7 mils both. |

Epon 826/ZZL-0803 is epichlorhydrin bisphenol A+catalyst.

Other materials which are suitable for the fiber, winding resin and gel coat include materials such as boron and graphite for the fiber and other epoxies, polyesters and phenolic resins as the winding and gel coat materials. Moreover, single and multiple layers may be used in the filter windings and winding angles of from 0 to 90 degrees have been found to produce satisfactory "crazings." The amount of filtered storm water passed through the various filters tested was from about 0.5 to about 12 gallons per minute at a pressure of from about 3000 to about 150 pounds per square foot of filter area, respectively. Here, it will be appreciated that the former are the results obtained when the filter is made rather rigid while the latter are the results obtained when the filter is made having much more flexibility.

Other techniques employed for producing a satisfactory filter body includes reinforcing the interior layer of resin with a thin, flexible, knitted fabric of the fiber material; hardening and mechanically crazing the interior layer of resin prior to overwinding the matrix resin bonded filament wound outer layer or layers; and hardening and inscribing the interior layer of resin prior to overwinding the matrix resin bonded filament wound outer layer or layers.

Flocculating agents may be used in conjunction with the present invention to improve the solids removal efficiency. By adding cationic or anionic flocculating aids to sewage increased the relative size of the suspended solids. In addition, some of the dissolved solids in the sewage were flocculated. The net result was an increase in filtration efficiency. For example, untreated municipal sewage yielded a suspended solids removal efficiency of 50.7% but when treated by adding in the order of 1 p.p.m. of cationic agent to the feed stream the efficiency was increased to 69.6%. In a similar test using anionic agent the efficiency was increased from 37% to 50%. The flocculating agents utilized were commercial water soluble, high molecular weight, synthetic polymers. Leach tanks and the like for supplying the flocculant may be suitably placed for periodically attended installations. For attended installations, the flocculant may be added by the attendant as required by any suitable and convenient means.

What I claim and desire to protect by Letters Patent is:

1. A self-adjusting and self-cleaning filtration unit for concentrating liquid-borne solids, said unit comprising:

(a) a filter body having a filament wound flexible structure bound together by resinous material, and (b) the filter body being constructed to be substantially impervious to normal pressure flow conditions of liquid and being pervious but able to filter said solids when expanded by an increase in hydraulic force as applied to the said filter body.

2. The filter unit according to claim 1 in which the filter body is wound at a winding angle of from 0 to 90 degrees.

3. The filter unit according to claim 1 in which the filaments are polypropylene.

4. The filter unit according to claim 1 in which the filaments are fiberglass.

5. The filter unit according to claim 1 in which the filaments are polyester.

6. A self-adjusting and self-cleaning filtration unit for concentrating liquid-borne solids, said unit comprising:

(a) a filter body having a filament wound flexible structure bound together by resinous material, (b) the filter body being constructed to be substantially impervious to normal pressure flow conditions of liquid and being pervious but able to filter said solids when expanded by an increase in hydraulic force as applied to the said filter body, and (c) the filter body being comprised of at least two layers of resin with the interior layer thereof being a resin of high modulus and low elongation and having a smooth surface and the other layer or layers thereof being a resin of low modulus and high elongation and serving as the primary binder and protector for the filaments.

7. A self-adjusting and self-cleaning filtration unit for concentrating liquid-borne solids, said unit comprising:

(a) a filter body having a filament wound flexible structure bound together by resinous material, (b) the filter body being constructed to be substantially impervious to normal pressure flow conditions of liquid and being pervious but able to filter said solids when expanded by an increase in hydraulic force as applied to the said filter body, and (c) the filter body being comprised of at least one layer of resin having low modulus and high elongation.

8. The filter unit according to claim 5 in which the interior layer of resin is reinforced with a thin, flexible, knitted fabric.

9. The filter unit according to claim 5 in which the interior layer of resin is hardened and mechanically crazed prior to overwinding the matrix resin bonded filament wound outer layer or layers.

10. The filter unit according to claim 5 in which the interior layer of resin is hardened and inscribed with a desired pattern of crazing prior to overwinding the matrix resin bonded filament wound outer layer or layers.

11. A self-adjusting and self-cleaning filtration unit for a sewage treatment system, said unit comprising:

(a) a filter body having a filament wound flexible structure bound together by resinous material, and (b) the filter body being constructed to be substantially impervious to normal pressure flow conditions of sewage and being pervious but able to filter solids when expanded by an increase in hydraulic force as applied to the said filter body under storm flow conditions of sewage.

12. The filter unit according to claim 11 in which the filter body is wound at a winding angle of from 0 to 90 degrees.

13. The filter unit according to claim 11 in which the filaments are polypropylene.

14. The filter unit according to claim 11 in which the filaments are fiberglass.

15. The filter unit according to claim 11 in which the filaments are polyester.

16. A self-adjusting and self-cleaning filtration unit for a sewage treatment system, said unit comprising:

(a) a filter body having a filament wound flexible structure bound together by resinous material, (b) the filter body being constructed to be substantially impervious to normal pressure flow conditions of sewage and being pervious but able to filter solids when expanded by an increase in hydraulic force as applied to the said filter body under storm flow conditions of sewage, and (c) the filter body being comprised of at least one layer of resin having low modulus and high elongation and serving as the primary binder and protector for the filaments.

17. A self-adjusting and self-cleaning filtration unit for a sewage treatment system, said unit comprising:

(a) a filter body having a filament wound flexible structure bound together by resinous material, (b) the filter body being constructed to be substantially impervious to normal flow pressure conditions of sewage and being pervious but able to filter solids when expanded by an increase in hydraulic force as applied to the said filter body under storm flow conditions of sewage, (c) the filter body being comprised of at least two layers of resin with the interior layer thereof being a resin of high modulus and low elongation and having a smooth surface and the other layer or layers thereof being a resin of low modulus and high elongation and serving as the primary binder and protector for the filaments, and (d) a swirl baffle disposed in juxtaposition to the interior of the filter body.

18. The filter unit according to claim 15 in which the interior layer of resin is reinforced with a thin, flexible, knitted fabric.

19. The filter unit according to claim 15 in which the interior layer of resin is hardened and mechanically crazed prior to overwinding the matrix resin bonded filament wound outer layer or layers.

20. The filter unit according to claim 15 in which the interior layer of resin is hardened and inscribed with a desired pattern of crazing prior to overwinding the matrix resin bonded filament wound outer layer or layers.

References Cited

UNITED STATES PATENTS

| | | | |
|---|---|---|---|
| 2,068,282 | 1/1937 | Strindberg | 210—359 X |
| 2,654,482 | 10/1953 | Robinson et al. | 210—356 |

REUBEN FRIEDMAN, Primary Examiner

F. A. SPEAR, JR., Assistant Examiner

U.S. Cl. X.R.

210—356, 433, 456, 497.1, 508